(12) United States Patent
Wong

(10) Patent No.: US 6,850,529 B1
(45) Date of Patent: Feb. 1, 2005

(54) LAYER 2 FUNNEL IN FAN OUT NETWORK DEVICE

(75) Inventor: Bruce F. Wong, Athens, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/414,748

(22) Filed: Oct. 6, 1999

(51) Int. Cl.[7] .............................................. H04L 12/28
(52) U.S. Cl. ...................................... 370/401; 370/466
(58) Field of Search ................................ 370/401, 402, 370/407, 408, 445, 446, 465, 468, 466

(56) References Cited

U.S. PATENT DOCUMENTS

| | | | |
|---|---|---|---|
| 4,627,052 A | | 12/1986 | Hoare et al. ................ 370/402 |
| 5,351,243 A | * | 9/1994 | Kalkunte et al. ........... 370/475 |
| 5,742,603 A | * | 4/1998 | Shafir et al. ................ 370/401 |
| 5,781,549 A | * | 7/1998 | Dai ............................. 370/398 |
| 5,892,926 A | * | 4/1999 | Witkowski et al. ......... 710/100 |
| 5,920,698 A | * | 7/1999 | Ben-Michael et al. ...... 709/224 |
| 5,920,900 A | * | 7/1999 | Poole et al. ................ 711/216 |
| 6,041,065 A | * | 3/2000 | Melvin ........................ 370/465 |
| 6,055,241 A | * | 4/2000 | Raza et al. .................. 370/408 |
| 6,067,585 A | * | 5/2000 | Hoang ........................ 370/401 |
| 6,108,345 A | * | 8/2000 | Zhang ........................ 370/401 |
| 6,151,635 A | * | 11/2000 | Bare .......................... 709/241 |
| 6,167,403 A | * | 12/2000 | Whitmire et al. ........... 707/10 |
| 6,226,292 B1 | * | 5/2001 | DiPlacido ................ 370/395.7 |
| 6,256,312 B1 | * | 7/2001 | Joh ............................. 370/401 |
| 6,381,242 B1 | * | 4/2002 | Maher et al. ............... 370/394 |
| 6,396,841 B1 | * | 5/2002 | Co et al. .................... 370/401 |
| 6,430,188 B1 | * | 8/2002 | Kadambi et al. ........... 370/398 |
| 6,446,131 B1 | * | 9/2002 | Khansari et al. ........... 709/238 |

* cited by examiner

*Primary Examiner*—Chi Pham
*Assistant Examiner*—Keith M. George
(74) *Attorney, Agent, or Firm*—Baker Botts L.L.P.

(57) ABSTRACT

A funnel in fan out network device includes a fast uplink port operating at a first data rate. A plurality of slow ports operate at a second data rate. The second data rate is slower than the first data rate. A processor is configured to direct a packet received on one of the slower ports directly to the fast uplink port without looking up the destination address of the packet.

74 Claims, 1 Drawing Sheet

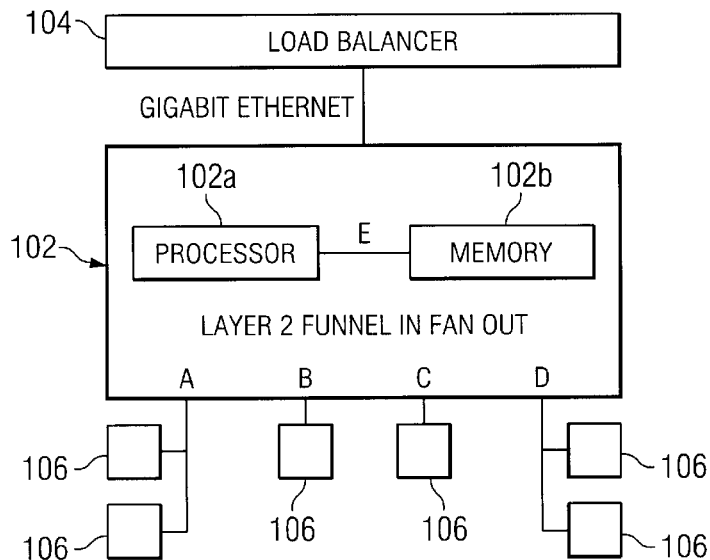
FIG. 1
| MAC ADDRESS | PORT | TIME TO LIVE |
|---|---|---|
| XX | A | 7 |
| YY | B | 12 |
| ZZ | C | 17 |
FIG. 2
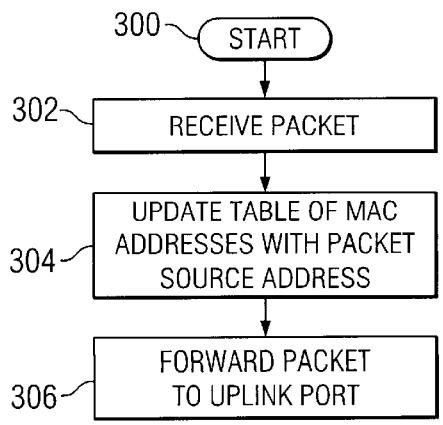
FIG. 3
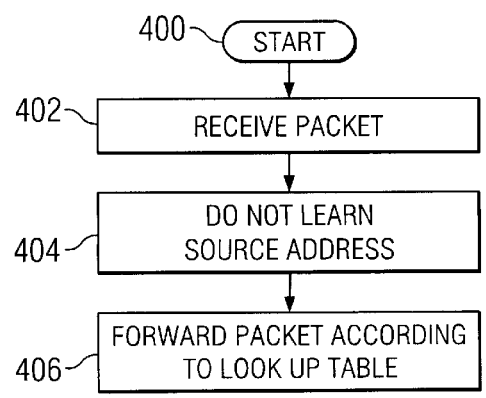
FIG. 4

LAYER 2 FUNNEL IN FAN OUT NETWORK DEVICE

FIELD OF THE INVENTION

The present invention relates generally to a data link layer (layer 2) multi-port bridge or switch that transfers packets between different networks. More specifically, a funnel in fan out device is disclosed that includes multiple ports including an uplink port designated to receive all packets sent from the remaining ports.

BACKGROUND OF THE INVENTION

The problem of networking a set of devices has been divided into layers. The bottom layer is a physical layer. It handles the actual physical connections between devices. The second layer is the data link layer. It describes how the data is formatted on the physical medium that connects the devices. The third layer is the network layer. It handles cases where there is greater than one connection per machine. The fourth layer is the transport layer. This determines that all of the messages from a source reach the destination reliably and in an unduplicated fashion. Often the second layer is subdivided into a Logical Link Control ("LLC") layer and a Media Access Control ("MAC") layer. A MAC address is required in this layer. In the TCP/IP suite of protocols employed on the Internet, the third layer or network layer is the IP layer. This layer requires a globally unique IP address in order to route packets to the right physical machine. The IP address is issued by a central authority. The TCP layer additionally requires a machine port number so that the packet is sent to the correct port of a specific machine. The present invention is implemented in one embodiment by directing packets to a network appliance using a layer 2 bridge or switch.

Bridges or switches that operate in the data link layer may be used to connect networks using different MAC level protocols such as Ethernet, Token Ring or Token Bus. Such devices do not examine the network layer header to transfer packets between networks and thus can copy IP, IPX, and OSI packets to different networks in contrast to a network level router (level 3) that handles packets conforming to a specific network layer protocol.

A bridge discovers the layer 2 addresses of devices on networks connected to it by examining packets sent by the devices and storing the layer 2 source addresses of the devices in a memory. When a bridge receives a packet, the bridge checks the packet destination address against its table of layer 2 addresses for each network that is connected to the bridge to determine the network interface to which the packet should be transferred. A multiport bridge has multiple ports that may be connected to multiple networks and the bridge determines the port that receives each incoming packet based on the layer 2 destination address of the packet and the layer 2 addresses known to the bridge to be reachable on each of its ports. It should be noted that throughout this specification reference is made to a multiport bridge or layer 2 switch and that whenever such reference is made, either device may be substituted for the other and other similar multiport layer 2 network devices may also be substituted for the multiport bridge or layer 2 switch.

A two port bridge that stores layer 2 addresses of devices connected to the two networks that are bridged is described in detail in U.S. Pat. No. 4,627,052 issued to Hoare et al., which is herein incorporated by reference for all purposes. The bridge keeps track of the layer 2 addresses of devices that send messages from networks connected to either of its ports. A layer 2 switch or multiport bridge is an extension of such a device where more than 2 ports are connected to networks or subnetworks and the multiport bridge or switch keeps a table of the layer 2 addresses of devices sending messages to each of the ports. Packets sent to the switch are inspected and transferred to the port that is connected to a network or subnetwork where the device corresponding to packet destination address has been transmitting.

Many layer 2 switches and multiport bridges are configured to have one of their ports running at a higher rate than the rest of the ports. The faster port is referred to as an uplink port. For example, a switch with 12 Fast Ethernet (100 Base T) ports and 1 Gigabit Ethernet port may be used to connect a number of small Fast Ethernet networks to a single larger network via the Gigabit Ethernet port. Such a switch functions similarly to a layer 2 switch having ports all operating at the same speed. A separate table of layer 2 addresses is maintained that may be reached via the fast uplink port just as a table of addresses is maintained for addresses that may be reached via any of the slower ports.

A number of network appliances have been developed that process or monitor all packets that enter or leave a network. For example, a load balancer such as the Cisco Local Director described in U.S. patent application Ser. No. 08/850,248, entitled "Distributing Connections To A Group Of Machines", filed May 2, 1997, is used to intercept and redirect packets sent to or from a network served by the Local Director. Similarly, a firewall may need to receive all packets sent to or from a protected network for the purpose of filtering packets. Packet monitors may also need to receive all packets sent to or from a network. In each of these cases, a traffic situation exists that is similar to the situation described above where multiple networks are connected through a layer 2 switch uplink to a larger network. Relatively light traffic is experienced in and out of the various subnetworks that comprise the network being serviced by the network appliance. Since all network traffic is seen by the network appliance, very heavy traffic is experienced on the interface that connects the network appliance to all of the subnetworks.

It would be useful if a layer 2 switch with an uplink port could be adapted for use with a network appliance that needs to receive all network traffic that enters and leaves a network.

SUMMARY OF THE INVENTION

A layer 2 funnel in fan out device is disclosed that directs all packets from subnetworks or devices connected to a set of ports operating at a slow speed to a single port operating at a fast speed. This is referred to as the funnel in aspect of the device. Packets from the fast port are bridged to the slower ports based on tables kept by the funnel in fan out device that include the layer 2 addresses of devices connected to the slower ports. This is referred to as the fan out aspect of the device. The tables need not include the addresses of devices connected to the fast port since all packets from the slow ports are automatically directed to the fast port. A network appliance that must receive all packets entering or leaving the network is connected to the fast port. In this manner, the layer 2 funnel in fan out device functions as a port multiplier for the network appliance.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

In one embodiment, a funnel in fan out network device includes a fast uplink port operating at a first data rate. A plurality of slow ports operate at a second data rate. The second data rate is slower than the first data rate. A processor is configured to direct a packet received on one of the slower ports directly to the fast uplink port without looking up the destination address of the packet.

In one embodiment, a method of directing packets to a network appliance includes receiving packets on a plurality of slow ports operating at a first data rate and recording the source addresses of the packets received from each slow port. Packets are transferred to a fast uplink port operating at a second data rate. The second data rate is faster than the first data rate; and the packets are transferred to the fast uplink port without determining whether a device connected to the fast uplink port corresponds to the packet destination address.

In one embodiment, a computer program product for directing packets to a network appliance includes computer instructions for receiving packets on a plurality of slow ports operating at a first data rate and recording the source addresses of the packets received from each slow port. Packets are transferred to a fast uplink port operating at a second data rate. The second data rate is faster than the first data rate; and the packets are transferred to the fast uplink port without determining whether a device connected to the fast uplink port corresponds to the packet destination address.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1 is a block diagram illustrating a layer 2 funnel in fan out device used to connect a load balancer to a set of network devices.

FIG. 2 is a diagram illustrating a table generated and stored by the funnel in fan out device to keep track of the devices connected to the various slow ports of the funnel in fan out device.

FIG. 3 is a flow chart illustrating a process executed for packets received at one of the slower ports of the funnel in fan out device.

FIG. 4 is a flow chart illustrating a process executed for packets received at the uplink port from the network appliance.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail in order not to unnecessarily obscure the present invention.

For the purpose of example, the funnel in fan out device described below is described as directing packets to a load balancing network appliance. It should be realized that other network appliances including a firewall and a packet monitor are substituted for the load balancing network appliance in other embodiments.

FIG. 1 is a block diagram illustrating a layer 2 funnel in fan out device 102 used to connect a load balancer 104 to a set of network devices 106. Funnel in fan out device 102 includes a processor 102a and a memory 102b. Load balancer 104 is connected to a single Gigabit Ethernet port (the uplink port) labeled E of funnel in fan out device 102. Network devices 106 are connected to various 100 Base T ports labeled A, B, C and D of funnel in fan out device 102. Network devices 106 may be connected individually to one of the 100 Base T ports or they may be connected indirectly via a subnetwork that includes a number of other network devices also connected to funnel in fan out device 102 through the same port. Although only four 100 Base T ports are shown for the purpose of illustration, ten or more 100 base T ports may be included in an actual system. In addition to the various ports shown which each include a network interface for transferring packets to and from communication lines attached to the ports, funnel in fan out device 102 also includes one or more microprocessors for processing packets and searching for addresses when necessary. Addresses and port designations are stored in one or more nonvolatile or volatile memories that contain one or more tables such as the table described in FIG. 2.

All packets entering funnel in fan out device 102 from the slower ports are sent to the uplink port so that they are intercepted by load balancer 104. The redirection of packets to load balancer 104 is accomplished very quickly and without a need to refer to a look up table. Instead of a look up, a universal rule that all packets from the slower ports are automatically routed to the uplink port is implemented. Unlike a conventional multiport bridge, no table of devices that may be reached via the uplink port is maintained by the funnel in fan out device.

Furthermore, there is no look up executed among the tables maintained by the funnel in fan out device to determine whether the destination address corresponds to a device that may be reached via any of the slower ports. Regardless of the destination address indicated in the packet header, each packet from one of the slower ports is always sent to the uplink port. This rule saves considerable time redirecting network packets to the load balancer. The load balancer receives all network packets simply by virtue of being connected to the uplink port. Furthermore the network packets are sent to the load balancer on a fast port so that all of the traffic from the various slower ports may be aggregated or "funneled" into the uplink port without overloading the network. The funnel in fan out device effectively positions the load balancer at a location on the network where it can intercept and process all of the packets sent to and from the network.

Once the load balancer receives a network packet, the load balancer may change the address of the packet to redirect the packet to a different destination on the network or the load balancer may route the packet to a different network. If the packet is sent back to the network that generated the packet and sent the packet to the load balancer via the funnel in fan out device, then the packet is sent back to the funnel in fan out device on the uplink port. Packets received on the uplink port by the funnel in fan out device are treated differently than packets received on any of the slower ports. Such packets are bridged ("fanned out") to the slower ports in a conventional manner based on the addresses of devices connected to the slower ports that have been discovered and stored by the funnel in fan out device.

FIG. 2 is a diagram illustrating a table generated and stored by the funnel in fan out device to keep track of the devices connected to the various slow ports of the funnel in fan out device. The addresses are used to bridge packets returning on the uplink port to the appropriate slow port on which the device corresponding to the packet layer 2 (MAC) address may be reached. The device with MAC address XX is found on port A; the device with MAC address YY is found on port B; and the device with MAC address ZZ is found on port C. The table also stores a time to live for each stored MAC address and port so that when devices are removed from the ports or the subnetworks attached to the ports, the entries indicating that such devices may be reached through their former ports are eventually deleted. Each time a device sends a packet to the funnel in fan out device on one of the slower ports, the source address of the packet is noted. Either a new entry is made in the table or the time to live of an existing entry is reset. It should be noted that in different embodiments the conceptual table shown is stored in different data structures such as a table in memory, a hash table, or a binary tree.

FIG. 3 is a flow chart illustrating a process executed for packets received at one of the slower ports of the funnel in fan out device. The process starts at 300. In a step 302, a packet is received. Next, in a step 304, a table such as the table shown in FIG. 2 is updated according to the packet source address. In a step 306, the packet is forwarded to the uplink port. The packet is forwarded to the uplink port regardless of the packet destination MAC address and without translating that address. No search of an address table is required. Since the MAC address is not translated for the packet to be forwarded to the network appliance connected to the uplink port, the MAC address may be used unchanged if the network appliance does not redirect the packet. This might occur, for example, if the network appliance is a packet monitor.

FIG. 4 is a flow chart illustrating a process executed for packets received at the uplink port from the network appliance. The process starts at 400. In a step 402, the funnel in fan out device receives a packet. Next, in a step 404, the funnel in fan out device skips learning the MAC source address of the packet. Whatever source address other than its own MAC address that the load balancer or other network appliance appends to the packet may not, in fact, be reachable via the uplink interface. In any case, there is no need to keep a table of addresses reachable via the uplink since all packets from the slow ports are forwarded to the uplink without an address look up being required. In a step 406, the funnel in fan out device forwards the packet to the slower interface indicated for the packet destination MAC address in a table such as the table shown in FIG. 2.

A layer 2 funnel in fan out device has been disclosed that forwards all packets received on a set of slower ports to a fast uplink port without referring to the packet destination address. When a network appliance such as a load balancer is connected to the uplink port, the funnel in fan out device functions as a port multiplier for the network appliance. The funnel in fan out device directs all packets to the network appliance. Packets sent back to the funnel in fan out device are bridged to a network device via one of the slower ports in a conventional manner.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A funnel in fan out network device comprising:
   a fast uplink port operating at a first data rate, wherein the fast uplink port is coupled to a network appliance;
   a plurality of slow ports operating at a second data rate, the second data rate being slower than the first data rate;
   a memory operable to store addresses, each address associated with a network device reachable via one of the plurality of slower ports; and
   a processor configured to direct a first packet received on one of the slower ports directly to the fast uplink port without looking up a destination address of the first packet, and configured to direct a second packet received on the fast uplink port to a particular slow port based on a destination address of the second packet; and
   wherein the funnel in fan out network device comprises a port multiplier for the network appliance.

2. A funnel in fan out network device as recited in claim 1, wherein the processor is further configured to store a source address of the first packet in the memory.

3. A funnel in fan out network device as recited in claim 2 wherein the source address is stored in a hash table.

4. A funnel in fan out network device as recited in claim 2 wherein the source address is stored in a binary tree.

5. A funnel in fan out network device as recited in claim 2 wherein the source address comprises a MAC address.

6. A funnel in fan out network device as recited in claim 2 wherein the packet received on one of the slower ports comprises a first packet and wherein the processor is further configured to direct a second packet received on the fast uplink port to a selected slow port from the plurality of slow ports based on a table of addresses stored in the memory, the table indicating that the destination address of the second packet is reachable via the selected slow port.

7. A funnel in fan out network device as recited in claim 1 wherein the funnel in fan out device comprises a layer 2 device.

8. A funnel in fan out network device as recited in claim 1 wherein the destination address of the first packet comprises a MAC address that corresponds to a device connected to one of the slow ports.

9. A funnel in fan out network device as recited in claim 1 wherein the uplink port is designated to receive all packets sent from the slow ports.

10. A funnel in fan out network device as recited in claim 1 wherein the funnel in fan out network device comprises a bridge.

11. A funnel in fan out network device as recited in claim 1 wherein the funnel in fan out network device comprises a switch.

12. A funnel in fan out network device as recited in claim 1 wherein the network appliance comprises a load balancer.

13. A funnel in fan out network device as recited in claim 1 wherein the network appliance comprises a firewall.

14. A funnel in fan out network device as recited in claim 1 wherein the network appliance comprises a packet monitor.

15. A method of directing packets to a network appliance comprising:

receiving a first packet on one of a plurality of slow ports of a port multiplier, the slow ports operating at a first data rate;

transmitting the first packet to a network appliance through a fast uplink port operating at a second data rate, the second data rate being faster than the first data rate, wherein the first packet is transmitted to the network appliance without determining whether a device connected to the fast uplink port corresponds to a packet destination address of the first packet;

receiving a second packet from the network appliance on the fast uplink post; and transferring the second packet to a slow port that corresponds to a destination address of the second packet.

16. A method of directing packets to a network appliance as recited in claim 15 further including recording a source address of the first packet, and wherein transferring the second packet comprises transferring the packet to a slow port that has previously sent a packet having a source address that corresponds to the destination address of the second packet.

17. The method of claim 15, further comprising storing a source address and a port indicator, wherein the source address comprises the address of a previous packet received on one of the slower ports and wherein the port identifier identifies the slower port on which the previous packet was received and wherein transferring the second packet comprises transferring the second packet only if the destination address of the second packet corresponds to the source address of a previous packet.

18. The method of claim 17, wherein storing comprises storing using a hash table.

19. The method of claim 17, wherein storing comprises storing using a binary tree.

20. The method of claim 17, wherein the source address further comprises a MAC address.

21. The method of claim 17, wherein transferring the second packet comprises directing a second packet received on the fast uplink port to a selected slow port, the slow port selected using a destination address of the second packet and the hash table.

22. The method of claim 15, wherein receiving a first packet comprises receiving on a layer 2 device.

23. The method of claim 15, wherein the destination address of the second packet comprises a MAC address that corresponds to a device connected to one of the slow ports.

24. The method of claim 15, wherein transmitting the first packet comprises transmitting any packet received on the plurality of slow ports to the network appliance through the fast uplink port.

25. The method of claim 15, wherein receiving a first packet comprises receiving on a bridge.

26. The method of claim 15, wherein receiving a first packet comprises receiving on a switch.

27. The method of claim 15, further comprising serving as a port multiplier for the network appliance.

28. The method of claim 27, wherein the network appliance comprises a load balancer.

29. The method of claim 27, wherein the network appliance comprises a firewall.

30. The method of claim 27, wherein the network appliance comprises a packet monitor.

31. A computer program product for directing packets to a network appliance, the computer program product being embodied in a computer readable medium and comprising computer instructions for:

receiving a first packet on one of a plurality of slow ports of a port multiplier, the slow ports operating at a first data rate;

transmitting the first packet to a network appliance through a fast uplink port operating at a second data rate, the second data rate being faster than the first data rate, wherein the first packet is transmitted to the network appliance without determining whether a device connected to the fast uplink port corresponds to a packet destination address of the first packet;

receiving a second packet on the fast uplink port; and transferring the second packet to a slow port that corresponds to the packet destination address of the second packet.

32. A computer program product as recited in claim 31 further including instructions for recording a source address of the first packet and wherein transferring the second packet comprises transferring the packet to a slow port that has previously sent a packet having a source address that corresponds to the destination address of the second packet.

33. The computer program product of claim 32, wherein recording comprises storing using a hash table.

34. The computer program product of claim 32, wherein recording comprises storing using a binary tree.

35. The computer program product of claim 32, wherein the source address further comprises a MAC address.

36. The computer program product of claim 32, wherein transferring the second packet comprises directing a second packet received on the fast uplink port to a selected slow port, the slow port selected using a destination address of the second packet and a port identifier associated with the second packet in memory.

37. The computer program product of claim 31, wherein recording comprises storing the source address of the first packet and a port indicator, wherein the port identifier identifies the slow port on which the first packet was received.

38. The computer program product of claim 31, wherein receiving comprises receiving on a layer 2 device.

39. The computer program product of claim 31, wherein the destination address of the second packet comprises a MAC address that corresponds to a device connected to one of the slow ports.

40. The computer program product of claim 31, wherein transmitting the first packet comprises transmitting any packet received on the plurality of slow ports to the network appliance through the fast uplink port.

41. The computer program product of claim 31, wherein receiving comprises receiving on a bridge.

42. The computer program product of claim 31, wherein receiving comprises receiving on a switch.

43. The computer program product of claim 31, further comprising computer instructions for:

serving as a port multiplier for the network appliance.

44. The computer program product of claim 43, wherein the network appliance comprises a load balancer.

45. The computer program product of claim 43, wherein the network appliance comprises is a firewall.

46. The computer program product of claim 43, wherein the network appliance is a packet monitor.

47. A device for directing packets to a network appliance comprising:
  means for receiving a first packet on one of a plurality of slow ports of a port multiplier, the slow ports operating at a first data rate; and
  means for transmitting the first packet to a network appliance through a fast uplink port operating at a second data rate, the second data rate being faster than the first data rate, wherein the first packet is transmitted to the network appliance without determining whether a device connected to the fast uplink port corresponds to a packet destination address of the first packet;
  means for receiving a second packet from the network appliance on the fast uplink port; and
  means for transferring the second packet to a slow port that corresponds to a destination address of the second packet.

48. A funnel in fan out network device comprising:
  a port multiplier comprising;
  fast uplink port operating at a first data rate; and
  a plurality of slow ports operating at a second data rate, the second data rate being slower than the first data rate;
  a memory operable to store addresses, each address associated with a network device reachable via one of the plurality of slower ports; and
  a processor configured to direct a first packet received on one of the slower ports directly to the fast uplink port without looking up a destination address of the first packet, and configured to direct a second packet received on the fast uplink port to a particular slow port based on a destination address of the second packet; and
  wherein the funnel in fan out network device comprises a bridge.

49. A funnel in fan out network device as recited in claim 48, wherein the processor is further configured to store a source address of the first packet in the memory.

50. A funnel in fan out network device as recited in claim 49 wherein the source address is stored in a hash table.

51. A funnel in fan out network device as recited in claim 49 wherein the source address is stored in a binary tree.

52. A funnel in fan out network device as recited in claim 49 wherein the source address comprises a MAC address.

53. A funnel in fan out network device as recited in claim 49 wherein the packet received on one of the slower ports comprises a first packet and wherein the processor is further configured to direct a second packet received on the fast uplink port to a selected slow port from the plurality of slow ports based on a table of addresses stored in the memory, the table indicating that the destination address of the second packet is reachable via the selected slow port.

54. A funnel in fan out network device as recited in claim 48 wherein the destination address of the first packet comprises a MAC address that corresponds to a device connected to one of the slow ports.

55. A funnel in fan out network device as recited in claim 48 wherein the uplink port is designated to receive all packets sent from the slow ports.

56. A method of directing packets to a network appliance comprising:
  receiving, at a port multiplier, a first packet on one of a plurality of slow ports operating at a first data rate;
  transferring the first packet to a fast uplink port operating at a second data rate, the second data rate being faster than the first data rate, wherein the first packet is transmitted to the fast uplink port without determining whether a device connected to the fast uplink port corresponds to a packet destination address of the first packet;
  receiving a second packet on the fast uplink post; and
  transferring the second packet to a slow port that corresponds to a destination address of the second packet.

57. The method of claim 56, further comprising recording a source address of the first packet, and
  wherein transferring the second packet comprises transferring the packet to a slow port that has previously sent a packet having a source address that corresponds to the destination address of the second packet.

58. The method of claim 56, further comprising storing a source address and a port indicator, wherein the source address comprises the address of a previous packet received on one of the slower ports and wherein the port identifier identifies the slower port on which the previous packet was received and wherein transferring the second packet comprises transferring the second packet only if the destination address of the second packet corresponds to the source address of a previous packet.

59. The method of claim 58, wherein storing comprises storing in a hash table.

60. The method of claim 58, wherein storing comprises storing in a binary tree.

61. The method of claim 58, wherein the source address further comprises a MAC address.

62. The method of claim 58, wherein transferring the second packet comprises directing a second packet received on the fast uplink port to a selected slow port, the slow port selected using a destination address of the second packet and the hash table.

63. The method of claim 56, wherein the destination address of the second packet comprises a MAC address that corresponds to a device connected to one of the slow ports.

64. The method of claim 56, wherein transferring the first packet comprises transferring any packet received on the plurality of slow ports fast uplink port.

65. A computer program product for directing packets to a network appliance, the computer program product being embodied in a computer readable medium and comprising computer instructions for:
  receiving, at a port multiplier, a first packet on one of a plurality of slow ports operating at a first data rate;
  transferring the first packet to a fast uplink port operating at a second data rate, the second data rate being faster than the first data rate, wherein the first packet is transmitted to the fast uplink port without determining whether a device connected to the fast uplink port corresponds to a packet destination address of the first packet;
  receiving a second packet on the fast uplink port; and
  transferring the second packet to a slow port that corresponds to the packet destination address of the second packet.

66. The computer program product of claim 65 further comprises instructions for recording a source address of the first packet and
  wherein transferring the second packet comprises transferring the packet to a slow port that has previously sent a packet having a source address that corresponds to the destination address of the second packet.

67. The computer program product of claim 66, wherein recording comprises storing using a hash table.

68. The computer program product of claim 66, wherein recording comprises storing using a binary tree.

69. The computer program product of claim 66, wherein the source address further comprises a MAC address.

70. The computer program product of claim 66, wherein transferring the second packet comprises directing a second packet received on the fast uplink port to a selected slow port, the slow port selected using a destination address of the second packet and a port identifier associated with the second packet in memory.

71. The computer program product of claim 66, wherein receiving comprises receiving on a layer 2 device.

72. The computer program product of claim 65, wherein recording comprises storing the source address of the first packet and a port indicator, wherein the port identifier identifies the slow port on which the first packet was received.

73. The computer program product of claim 65, wherein the destination address of the second packet comprises a MAC address that corresponds to a device connected to one of the slow ports.

74. The computer program product of claim 65, wherein transferring the first packet comprises transferring any packet received on the plurality of slow ports to the fast uplink port.

* * * * *

UNITED STATES PATENT AND TRADEMARK OFFICE
CERTIFICATE OF CORRECTION

PATENT NO.    : 6,850,529 B1
DATED         : February 1, 2005
INVENTOR(S)   : Bruce F. Wong Page 1 of 1

It is certified that error appears in the above-identified patent and that said Letters Patent is hereby corrected as shown below:

<u>Column 8,</u>
Line 67, after "comprises" delete "is".

Signed and Sealed this

Twenty-fifth Day of April, 2006

JON W. DUDAS
*Director of the United States Patent and Trademark Office*